United States Patent [19]

Strasilla et al.

[11] Patent Number: 5,151,318
[45] Date of Patent: Sep. 29, 1992

[54] REINFORCING MATERIAL

[75] Inventors: Dieter Strasilla, Weil am Rhein, Fed. Rep. of Germany; Richard Stössel, Allschwil, Switzerland; Rolf Mülhaupt, Freiburg, Fed. Rep. of Germany; Ursula Kreibich, Riehen, Switzerland

[73] Assignee: Ciba-Geigy Corporation, Ardsley, N.Y.

[21] Appl. No.: 523,963

[22] Filed: May 16, 1990

[30] Foreign Application Priority Data

May 26, 1989 [CH] Switzerland .................. 1980/89

[51] Int. Cl.$^5$ .................. B32B 7/12; B32B 15/04; B32B 27/34
[52] U.S. Cl. .................. 428/246; 428/251; 428/252; 428/261; 428/265; 428/267; 428/268; 428/345; 428/354; 428/355; 428/40; 428/262; 428/290; 428/408; 428/413
[58] Field of Search ............... 428/261, 343, 346, 352, 428/354, 355, 246, 251, 252, 265, 267, 268

[56] References Cited

U.S. PATENT DOCUMENTS

| 4,092,443 | 5/1978 | Green | 427/53 |
| 4,214,026 | 7/1980 | Ibata et al. | 428/67 |
| 4,252,593 | 2/1981 | Green | 156/231 |
| 4,295,907 | 10/1981 | Cordts et al. | 428/426 |
| 4,369,224 | 1/1983 | Cordts et al. | 428/285 |
| 4,374,890 | 2/1983 | Shimizu et al. | 428/212 |
| 4,378,395 | 3/1983 | Asoshina et al. | 428/212 |
| 4,444,818 | 4/1984 | Tominaga et al. | 428/36 |

Primary Examiner—George F. Lesmes
Assistant Examiner—Kathryne E. Shelborne
Attorney, Agent, or Firm—JoAnn Villamizar; William A. Teoli, Jr.

[57] ABSTRACT

Self-adhesive reinforcing material comprising
a) a UV-transparent plastic film to which
b) a woven fabric impregnated with a partially acrylate-modified epoxy resin is applied which, on the side facing away from the film a), is coated with
c) a layer of an epoxy resin which again is partially acrylate-modified, the resins of b) and c) being converted by UV irradiation to a gelled state which can be further cured by heat, and containing a heat-activatable hardener component, and
d) a release paper applied to the side opposite the film a), is very suitable for reinforcing sheet metal.

9 Claims, No Drawings

REINFORCING MATERIAL

The present invention relates to a self-adhesive reinforcing material, to a process for its manufacture and to the use thereof for reinforcing sheet metal.

Reinforcing materials for metal sheets are known. Thus U.S. Pat. No. 4,374,890 describes adhesive boards which comprise two laminated layers of epoxy resins having different moduli of elasticity. Thus the resin layer with a low modulus of elasticity gives the adhesive board the necessary adhesion to the substrate, while the resin layer with the high modulus of elasticity gives the adhesive board the strength necessary for reinforcing the metal sheet.

The layers, which are to be manufactured separately, are laminated by means of the adhesive properties of the two layers or by means of hot melt adhesion through heating the layers, although not sufficiently to cure the resin layers.

U.S. Pat. No. 4,378,395 discloses multilayer reinforcing materials, e.g. for metal sheets, which comprise, in addition to two epoxy resin layers with different moduli of elasticity, a third layer consisting of a foamable material which foams on heat-curing. For adhesion to the substrate, the edge zones of these reinforcing materials are only two-layer. Such systems are used in the uncured or semicured state.

Both these systems of reinforcing materials have the disadvantage that they can only be stored for a limited time because of the phenomenon known as cold flow, whereby uncured resin material flows out of the resin layers at the edge zones and sticks to resin material flowing out of other adhesive boards in a stack of boards, making it impossible to separate the individual boards in the stack. Attempts are made to overcome this disadvantage using extensively overlapping release papers, but this is not capable of making up for the reduction in quality of the edge zones of the boards which is associated with cold flow.

German patent application 2 706 549 describes a process for the manufacture of prepregs, wherein a fibrous reinforcing material is impregnated with a liquid compound containing an epoxy resin and a photopolymerizable compound as well as a heat-activated hardener for the epoxy resin and, if necessary, a photopolymerization catalyst, and is converted to a solid but still heat-curable state by exposure to actinic radiation. It is also possible to use dual-function resins.

U.S. Pat. No. 4,295,907 describes a continuous process for the manufacture of glass fibre-reinforced laminates, wherein a UV-transparent film is used as a transporting base to which a first resin layer is applied and gelled by UV irradiation, this being followed successively by the application of a layer of unsaturated polyester and glass fibres and a further UV-transparent film as a facing. The laminate built up in this way then passes through a heating zone and a cooling zone, after which the cured board is sawn into its final shape.

There is no mention of the possibility of using a laminate of this structure in a state which is still heat-curable.

There is a need for reinforcing material which is self-adhesive, even on oily substrates, gives the substrate, such as metal sheets, the necessary strength and is both hygienic to handle and well capable of being stored.

Surprisingly, a reinforcing material has now been found which meets these requirements and is also very resistant to ageing, even in the cured state.

The present invention relates to a self-adhesive reinforcing material comprising a) a UV-transparent plastic film to which
b) a woven fabric impregnated with a partially acrylate-modified epoxy resin is applied which, on the side facing away from the film a), is coated with
c) a layer of an epoxy resin which again is partially acrylate-modified, the resins of b) and c) being converted by UV irradiation to a gelled state which can be further cured by heat, and containing a heat-activatable hardener component, and
d) a release paper applied to the side opposite the film a).

In principle, any films made of plastics which show no absorption in the UV region of 200–400 nm and which are chemically resistant to the epoxy resins used and withstand a temperature of 180° C. can be used as UV-transparent plastic films. Examples of such films are those made of polyethylene, polypropylene, polyamide or polyethylene terephthalate. It is preferred to use a film made of polyethylene terephthalate. The thickness of the film is conveniently chosen so that it can easily be bent and rolled. It is preferably 5–30 μm and especially 10–15 μm.

The partially acrylate-modified epoxy resins used in the reinforcing materials of the invention can be prepared by methods known per se, e.g. by reacting epoxy compounds having at least two 1,2-epoxy groups per molecule with acrylic or methacrylic acid or acrylic-substituted or acrylamide-substituted carboxylic acids, the amount of acrylic component being less than the stoichiometric amount, based on the content of epoxy groups.

Suitable epoxy resins which can be partially acrylate-modified in the above manner are all types of epoxy resins, for example those containing groups bonded direct to oxygen, nitrogen or sulfur atoms of the formula

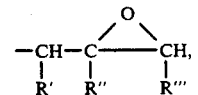

wherein either R' and R'" are each a hydrogen atom, in which case R" is a hydrogen atom or a methyl group, or R' and R'" together are —CH$_2$CH$_2$— or —CH$_2$CH$_2$CH$_2$—, in which case R" is a hydrogen atom.

Examples of such resins are polyglycidyl and poly(β-methylglycidyl) esters obtainable by reacting a compound containing two or more carboxylic acid groups per molecule with epichlorohydrin, glycerol dichlorohydrin or β-methylepichlorohydrin in the presence of alkali. Such polyglycidyl esters can be derived from aliphatic polycarboxylic acids, e.g. oxalic acid, succinic acid, glutaric acid, adipic acid, pimelic acid, suberic acid, azelaic acid, sebacic acid or dimerized or trimerized linoleic acid, from cycloaliphatic polycarboxylic acids such as tetrahydrophthalic acid, 4-methyltetrahydrophthalic acid, hexahydrophthalic acid and 4-methylhexahydrophthalic acid, and from aromatic polycarboxylic acids such as phthalic acid, isophthalic acid and terephthalic acid.

Further examples are polyglycidyl and poly(β-methylglycidyl) ethers obtainable by reacting a compound containing at least two free alcoholic and/or phenolic hydroxyl groups per molecule with the appropriate epichlorohydrin under alkaline conditions, or in the presence of an acid catalyst followed by treatment with alkali. These ethers can be prepared, with poly(epichlorohydrin), from acyclic alcohols such as ethylene glycol, diethylene glycol and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol and sorbitol, from cycloaliphatic alcohols such as resorcitol, quinitol, bis(4-hydroxycyclohexyl)methane, 2,2-bis(4-hydroxycyclohexyl)propane and 1,1-bis(hydroxymethyl)cyclohex-3-ene, and from alcohols with aromatic rings, such as N,N-bis(2-hydroxyethyl)aniline and p,p'-bis(2-hydroxyethylamino)diphenylmethane. They can also be prepared from mononuclear phenols such as resorcinol and hydroquinone, from polynuclear phenols such as bis(4-hydroxyphenyl)methane, 4,4-dihydroxybiphenyl, bis(4-hydroxyphenyl) sulfone, 1,1,2,2-tetrakis(4-hydroxyphenyl)ethane, 2,2-bis(4-hydroxyphenyl)propane (otherwise known as bisphenol A) and 2,2-bis(3,5-dibromo-4-hydroxyphenyl)propane, and from novolaks formed from aldehydes such as formaldehyde, acetaldehyde, chloral and furfural, with phenols such as phenol itself and phenol substituted on the ring by chlorine atoms or alkyl groups each having up to nine carbon atoms, such as 4-chlorophenol, 2-methylphenol and 4-tert-butylphenol.

Poly(N-glycidyl) compounds include, for example, those obtained by dehydrochlorination of the reaction products of epichlorohydrin and amines containing at least two amino hydrogen atoms, such as aniline, n-butylamine, bis(4-aminophenyl)methane and bis(4-methylaminophenyl)methane, triglycidyl isocyanurate and also N,N'-diglycidyl derivatives of cyclic alkyleneureas such as ethyleneurea and 1,3-propyleneurea, and of hydantoins such as 5,5-dimethylhydantoin.

Examples of poly(S-glycidyl) compounds are the di-S-glycidyl derivatives of dithiols such as ethane-1,2-dithiol and bis(4-mercaptomethylphenyl) ether.

Examples of epoxy resins with groups of the formula

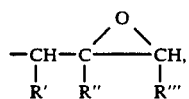

wherein R' and R''' together are a —CH$_2$CH$_2$— or a —CH$_2$CH$_2$CH$_2$— group are bis(2,3-epoxycyclopentyl) ether, 2,3-epoxycyclopentyl glycidyl ether, 1,2-bis(2,3-epoxycyclopentoxy)ethane and 3,4-epoxycyclohexylmethyl-3',4'-epoxycyclohexanecarboxylate.

Other possible epoxy resins are those in which the 1,2-epoxy groups are bonded to different types of heteroatom, e.g. the N,N,O-triglycidyl derivative of 4-aminophenol, the glycidyl ether/glycidyl ester of salicylic acid or p-hydroxybenzoic acid, N-glycidyl-N'-(2-glycidyloxypropyl)-5,5-dimethylhydantoin and 2-glycidyloxy-1,3-bis(5,5-dimethyl-1-glycidylhydantoin-3-yl)propane.

Mixtures of epoxy resins can be used if desired.

Preferred epoxy resins are the polyglycidyl ethers, polyglycidyl esters and N,N'-diglycidylhydantoins. Especially preferred resins are the polyglycidyl ethers of 2,2-bis(4-hydroxyphenyl)propane and bis(4-hydroxyphenyl)methane.

The epoxy resin is conveniently acrylate-modified to an extent of not more than 30 mol %, based on the total amount of epoxy resin, preferably to an extent of 1-20 mol % and most preferably of 5-10 mol %.

Acrylic oligomers, e.g. carboxyl-terminated butadiene/acrylonitrile oligomers, can also be used as the acrylate component.

Woven fabrics suitable for impregnation according to the invention with the acrylate-modified epoxy resins can consist e.g. of natural or synthetic fibres such as glass, boron, carbon, silicon carbide or aromatic polyamide. It is preferred to use woven fabrics consisting of glass, carbon or aromatic polyamide fibres.

The resins used as the impregnating resin for the woven fabric and as the resin for the layer c) can be the same or different, but are preferably the same.

The resin c) of the layer preferably contains a filler as well. Examples of possible fillers are quartz powder, amorphous quartz, talc, wollastonite, hollow glass spheres or amorphous aluminium silicate. The particle size is preferably 5-500 μm.

Hollow glass spheres or amorphous aluminium silicate are preferred.

Examples of suitable heat-activatable hardener components for the acrylate-modified epoxy resins are polycarboxylic acid anhydrides, dicyandiamide, complexes of amines, such as exclusively tertiary amines, with boron trifluoride or boron trichloride, latent boron difluoride chlorates, aromatic polyamines and imidazoles, e.g. 2-ethyl-4-methylimidazole. Dicyandiamide is preferred.

The amount of heat-activated hardener, based on the amount of epoxy resin, is preferably 2-20% by weight and especially 5-15% by weight.

The hardener is conventionally dissolved or suspended in the resin component prior to impregnation or coating.

If necessary, it is also possible for an accelerator to be added to the hardener. Examples of accelerators are tertiary amines, salts thereof or quaternary ammonium compounds, such as 2,4,6-tris(dimethylaminomethyl)phenol, 1-methylimidazole, benzyldimethylamine or tetramethylammonium chloride.

The acrylate-modified epoxy resins can also contain other conventional additives such as flexibilizers, flow control agents, adhesion promoters or wetting agents.

The manufacture of the reinforcing materials of the invention is novel.

Thus the present invention further relates to a process for the manufacture of the reinforcing materials of the invention, which comprises the following steps:
 i) impregnation of the woven fabric by immersion in a partially acrylate-modified epoxy resin containing a photopolymerization catalyst and a heat-activatable hardener, and removal of the excess resin,
 ii) application, to one side, of a plastic film transparent to UV radiation, so that the film is on the underside of the impregnated fabric,
 iii) application, to the topside of the fabric, of a layer of a partially acrylate-modified epoxy resin containing a photopolymerization catalyst and a heat-activatable hardener for the epoxy resin, iv) exposure of both sides of the impregnated and coated fabric in order to gel the acrylate-modified epoxy resins by photopolymerization of the acrylate groups, exposure being effected with UV light and being carried out from underneath through the UV-transparent film, and v) application of a release paper to the side opposite the film.

After step iv), the coating step iii) and the exposure step iv) can be repeated one or more times if necessary, this exposure being carried out in each case only from the same side as the newly applied layer.

In principle, the process can be carried out piecemeal or continuously.

The continuous procedure is preferred.

In the continuous process, the woven fabric runs continuously through the impregnating bath, the film is then fed in from underneath and the resin layer is applied from above, the resulting impregnated and coated fabric is fed with the film into an irradiation apparatus and, after gellation of the resin, the release paper is applied continuously, the fabric being moved forwards by traction on the product side.

Preferably, the resin components for impregnation and coating are kept at elevated temperature, in particular at 50°-100° C., so that the impregnating resin can penetrate the woven fabric more easily as a result of the reduced viscosity and the coating resin can give a uniform layer as a result of the improved flow.

Examples of suitable photopolymerization catalysts are organic peroxides and hydroperoxides, α-halogenated acetophenones such as 2,2,2-trichloro-4'-tert-butylacetophenone, benzoin and alkyl ethers thereof, e.g. the n-butyl ether, benzophenones, O-alkoxycarbonyl derivatives of the oximes of benzil or 1-phenylpropane-1,2-dione, such as benzil (O-ethoxycarbonyl)-α-monoxime, or benzil ketals, e.g. the dimethylketal thereof. Benzil dimethylketal is preferred.

In general, 0.1 to 20% by weight, and preferably 0.5 to 15% by weight, of photopolymerization catalyst is used, based on the total weight of photopolymerizable compounds.

In the photopolymerization process, it is preferred to use UV radiation with a wavelength of 200-400 nm. Suitable radiation sources are both point sources and flat-shaped radiators (lamp carpets), it being possible to use, for example, carbon arcs, mercury vapour arcs, tube lamps containing luminophores which radiate UV light, argon and xenon glow lamps or metal halide lamps. It is preferred to use mercury vapor arcs and metal halide lamps.

The time required for exposure of the photopolymerizable resin component will depend on a variety of factors such as the individual resin used, the amount of this resin on the woven fabric (layer thickness), the type of light source and its distance from the impregnated material.

Those skilled in the art of photopolymerization can easily determine the suitable times, but in all cases the product must still be heat-curable after photopolymerization; for this reason, the photopolymerization is carried out at temperature below those at which extensive curing of the epoxy component of the acrylate-modified epoxy resin by the heat-activatable hardener would occur.

The layer thickness of the resin c) is conveniently 0.3-20 mm and preferably 0.3-10 mm. It can be adjusted during coating in a manner known to those skilled in the art, e.g. by varying the size of the orifice in the coating supply vessel and varying the coating speed or, preferably, by using a blade.

These release papers which can be used must be readily removable from the gelled reinforcing material and are known to those skilled in the art. Silicone release papers are especially suitable.

The reinforcing materials of the invention possess a good tackiness on various substrates, in particular on oily sheet metal. Furthermore, they have a good cold flow behaviour, i.e. under pressure, such as arises during storage in stacks, the reinforcing material of the invention remains dimensionally stable and does not flow out.

Reinforcing materials with a cold flow index $\leq 1.5$ are preferred. This index is defined as the quotient of the area after loading and the area before loading of a sample of material exposed to a pressure of ca. 1 bar for 1 hour at room temperature.

The reinforcing materials of the invention are therefore very suitable for use as self-adhesive reinforcement for sheet metal. Such reinforcements are lightweight and therefore very suitable for apparatus engineering and the car and aircraft industries, where weight reduction is a major consideration.

On account of its good flexibility, the reinforcing material can be applied very successfully to deformed metal sheets.

Hygienic conditions can easily be maintained during the processing and curing of the reinforcing materials of the invention, since the UV-transparent plastic film does not have to be removed. This also means that the surface is perfectly smooth and no reinforcing fibres come out of the resin.

In the following Examples, all data refer to weight, e.g. % by weight or parts by weight, unless indicated otherwise.

EXAMPLE 1

A 0.6 mm thick woven glass fibre fabric (from Glastex, Horgen, CH) is fed at a speed of 0.5 m/min through an impregnating resin formulation contained in a trough, said formulation being at a temperature of 60° C. and having the following composition:

| | |
|---|---|
| Bisphenol A diglycidyl ether | 54.16% |
| Bisphenol A diglycidyl ether monomethacrylate | 15.00% |
| Adipic acid/neopentyl glycol polyester | 25.00% |
| Dicyandiamide | 4.37% |
| Mixture of polyvinylphenol and 2,4,6-tris(dimethylaminomethyl)phenol | 0.72% |
| Benzil dimethylketal | 0.24% |
| Glycidoxypropyltrimethoxysilane | 0.50% |

Excess resin material is then pinched off on rollers and a 12 μm thick polyethylene terephthalate film is applied to the impregnated fabric from underneath, at the same speed as said fabric.

The fabric covered on the underside in this way is then coated on the topside by means of a blade, at 80° C., with a ca. 1 mm thick layer of a resin formulation having the following composition:

| | |
|---|---|
| Bisphenol A diglycidyl ether | 51.82% |

-continued

| | |
|---|---|
| Bisphenol A diglycidyl ether dimethacrylate | 6.70% |
| Adipic acid/neopentyl glycol polyester | 21.10% |
| Amorphous aluminium silicate, particle size 5–150 μm, apparent density 0.23 g/cm$^3$ | 15.00% |
| Dicyandiamide | 3.82% |
| Mixture of polyvinylphenol and 2,4,6-tris(dimethylaminomethyl)phenol | 0.63% |
| Benzil dimethylketal | 0.21% |
| Glycidoxypropyltrimethoxysilane | 0.50% |
| Fluorinated alkyl ester (3M, USA) | 0.25% |

The impregnated glass fibre fabric coated in this way and covered underneath with the UV-transparent polyethylene terephthalate film then passes at the same speed through an irradiation chamber, where both sides of the material are irradiated by a high-pressure mercury vapour radiator (IST UV radiator from Metz GmbH, Nürtingen, FRG) with UV light of wavelength 365 nm and at an exposure rate of ca. 1000 mJ/cm$^2$.

After gelation of the resin formulations, a silicone release paper (94 g/m$^2$) is applied continuously to the coated side, thus completing the reinforcing material.

The forward movement of the reinforcing material and the glass fibre fabric is provided by a caterpillar pull-off, on the same side as the finished reinforcing material, at a speed of 0.5 m/min.

EXAMPLES 2 AND 3

An identical woven glass fibre fabric is impregnated, covered, coated and exposed by the method described in Example 1, the impregnating resin formulations and coating resin formulations having the compositions shown in Table 1.

TABLE 1

| | Example 2 [%] | Example 3 [%] |
|---|---|---|
| Impregnating resin formulation | | |
| Bisphenol A diglycidyl ether | 35.74 | 50.94 |
| Epoxy resin based on bisphenol A EP 2.55–2.70 eq/kg | 13.33 | |
| Bisphenol A diglycidyl ether monomethacrylate | 10.00 | 30.00 |
| Carboxyl-terminated butadiene/acrylonitrile oligomer | 15.00 | 14.99 |
| Dibutyltin dilaurate | 0.02 | 0.02 |
| C$_9$ hydrocarbon resin (from Nevcin, Uithoorn, NL) | 20.00 | |
| Dicyandiamide | 4.81 | 3.84 |
| mixture of polyvinylphenol and 2,4,6-tris(dimethylaminomethyl)phenol | 0.79 | |
| Benzil dimethylketal | 0.26 | 0.21 |
| Coating resin formulation | | |
| Bisphenol A diglycidyl ether | 29.92 | 52.84 |
| Epoxy resin based on bisphenol A EP 2.55–2.70 eq/kg | 11.16 | |
| Bisphenol A diglycidyl ether monomethacrylate | 8.37 | 8.75 |
| Carboxyl-terminated butadiene/acrylonitrile oligomer | 12.56 | 13.10 |
| Dibutyltin dilaurate | 0.01 | |
| C$_9$ hydrocarbon resin (from Nevcin, Uithoorn, NL) | 16.74 | 8.75 |
| Hollow glass spheres, $\phi$ 5–250 μm ASTMD3101-72 0.19 ± 10% | 16.30 | |
| Amorphous aluminium silicate, $\phi$ 5–150 μm apparent density 0.23 g/cm$^3$ | | 12.50 |
| Dicyandiamide | 4.02 | 3.44 |
| Mixture of polyvinylphenol and 2,4,6-tris(dimethylaminomethyl)phenol | 0.66 | |
| Benzil dimethylketal | 0.22 | 0.19 |
| Triphenylphosphine | | 0.02 |

TABLE 1-continued

| | Example 2 [%] | Example 3 [%] |
|---|---|---|
| Glycidoxypropyltrimethoxysilane | | 0.41 |

EXAMPLE 4

The adhesive strength of the resin formulations not gelled by UV is tested in the following manner:

According to DIN 53283, oiled steel plates are adhesively bonded, curing is carried out for 30 min at 180° C. and the adhesion is then determined by the shear tension test.

The results are shown in Table 2.

TABLE 2

| Impregnating resin formulation according to Ex. | Coating resin formulation according to Ex. | Ultimate adhesive strength [N/mm$^2$] | |
|---|---|---|---|
| | | 23° C. | 80° C. |
| 1 | | 21.4 | 12.2 |
| 3 | | 13.9 | |
| | 1 | 21.6 | 13.3 |
| | 3 | 18.9 | |

EXAMPLE 5

The flexural strength of a metal sheet strengthened with the reinforcing material is determined in the following manner:

After removal of the release paper, the coated side of a piece (170×25×1.6 mm) of the UV-gelled reinforcing material is applied to an oiled steel sheet (170×25×0.5 mm) and curing is then carried out for 30 min at 180° C. in a forced air oven.

With the metal side on top, the test piece cured in this way is placed on a supporting device, the test piece lying on two supports with a bearing radius of 5 mm each and a horizontal separation of 100 mm. A punch with a head radius of 5 mm is pressed on to the test piece from above at a speed of 5 mm/min until the test piece shows a deflection of 3 mm, and the force required to produce this deflection is determined.

The punch is then pressed further down on to the test piece at a speed of 10 mm/min until the cured reinforcing material breaks. At this point, the force is measured again together with the deflection at break.

The results are shown in Table 3.

TABLE 3

| Reinforcing material according to Example | Force [daN] at 3 mm | Force [daN] at break | Deflection [mm] at break |
|---|---|---|---|
| 1 | 5.7 | 18.0 | 22.5 |
| 2 | 5.8 | 22.8 | 22.4 |
| 3 | 6.2 | 19.0 | 20.0 |

EXAMPLE 6

After removal of the release paper, the coated side of a piece (60×70 mm) of the UV-gelled reinforcing material is applied to a steel sheet (70×110 mm) which has been oiled by immersion in a 10% solution of mineral oil in heptane. After 5 min (oil uptake), the test piece is placed in a commercially available degreasing bath for 10 min at 60° C. and then rinsed with water and immersed in a commercially available phosphatizing bath for 10 min. With the metal side on top, the test piece is then cured for 30 min at 180° C. in a forced air oven.

The test is considered to have been passed if the reinforcing material does not come away from the steel sheet.

Reinforcing material according to Example 3: passed.

EXAMPLE 7

Using a Mettler TA 3000 system by the TMA method, the glass transition temperature, Tg, is determined on samples cured for 30 min at 180° C. in a forced air oven.

The results are shown in Table 4.

TABLE 4

| Reinforcing material according to Example | Tg [°C.] |
| --- | --- |
| 1 | 73.4 |

EXAMPLE 8

Cold flow test: 20×20×1.8 mm samples of UV-gelled reinforcing material are placed under a load of 4 kg (≦1 bar) for 1 hour at room temperature (~23° C.).

After this time, the area which has been pressed out is determined. This is done by measuring the areas of photocopies or by cutting these areas out and weighting them.

The cold flow index is calculated as follows:

$$\text{Cold flow index} = \frac{\text{Area after loading}}{\text{Area before loading}}$$

4 determinations are made and the mean value is calculated.

The results are shown in Table 5.

TABLE 5

| UV-gelled reinforcing material according to Example | Cold flow index |
| --- | --- |
| 1 | 1.0 |
| 2 | 1.1 |
| 3 | 1.5 |

What is claimed is:

1. A self-adhesive reinforcing material comprising
   a) a UV-transparent plastic film to which
   b) a woven fabric impregnated with a partially acrylate-modified epoxy resin is applied which, on the side facing away from the film a), is coated with
   c) a layer of an epoxy resin which again is partially acrylate-modified, the resins of b) and c) being converted by UV irradiation to a gelled state which can be further cured by heat, and containing a heat-activatable hardener component, and
   d) a release paper applied to the side opposite the film a).

2. A self-adhesive reinforcing material according to claim 1, wherein the epoxy resins are partially acrylate-modified to an extent of 1-20 mol %, based on the total amount of epoxy resin.

3. A self-adhesive reinforcing material according to claim 1, wherein the resins of b) and c) are the same.

4. A self-adhesive reinforcing material according to claim 1, wherein the epoxy resin c) contains a filler as well.

5. A self-adhesive reinforcing material according to claim 1, wherein the layer c) has a thickness of 0.3-10 mm.

6. A self-adhesive reinforcing material according to claim 1, wherein the heat-activatable hardener component for the epoxy resin is dicyandiamide.

7. A self-adhesive reinforcing material according to claim 1, wherein the cold flow index has a value of ≦1.5.

8. A self-adhesive reinforcing material according to claim 1, wherein the film a) is a polyethylene, polypropylene, polyamide or polyethylene terephthalate film.

9. A self-adhesive reinforcing material according to claim 1, wherein the woven fabric consists of glass, carbon or aromatic polyamide fibres.

* * * * *